United States Patent

[11] 3,539,049

| [72] | Inventors | Anthony J. D'Eustachio and Donald R. Johnson, Wilmington, Delaware |
|---|---|---|
| [21] | Appl. No. | 753,198 |
| [22] | Filed | Aug. 16, 1968 |
| [45] | Patented | Nov. 10, 1970 |
| [73] | Assignee | E. I. du Pont de Nemours and Company Wilmington, Delaware a corporation of Delaware |

[54] DISPOSABLE FILTER
7 Claims, 4 Drawing Figs.

[52] U.S. Cl. .............................................. 210/477, 210/482
[51] Int. Cl. .............................................. B01d.23/08, B01d 23/28
[50] Field of Search ................................... 210/337, 451, 455, 474, 477, 476, 482, 339, 445

[56] References Cited
UNITED STATES PATENTS

| 565,890 | 8/1896 | Fowler | 210/339 |
| 942,121 | 12/1909 | White | 210/337X |
| 2,835,392 | 5/1958 | Hamilton | 210/477 |
| 3,283,911 | 11/1966 | Reise | 210/451X |
| 3,295,686 | 1/1967 | Krueger | 210/455 |
| 986,301 | 3/1911 | Michel | 210/477 |
| 3,087,849 | 4/1963 | Smith | 210/445X |

FOREIGN PATENTS

| 1,275,059 | 9/1961 | France | 210/451 |
| 743,728 | 1/1956 | Great Britain | 210/476 |
| 936,396 | 9/1963 | Great Britain | 210/498 |

Primary Examiner—Reuben Friedman
Assistant Examiner—C. M. Ditlow
Attorney—Herbert M. Wolfson

ABSTRACT: A disposable filter unit in which a filter cloth is bonded to a support means in such manner as to form a leak-tight substantially crevice-free filter. A supply tube supported on the support is also provided to funnel filtrate placed within the supply tube through the filter cloth.

Patented Nov. 10, 1970

3,539,049

INVENTORS
ANTHONY J. D'EUSTACHIO
DONALD R. JOHNSON

BY

ATTORNEY 3,539,049

DISPOSABLE FILTER

BACKGROUND

Many of the filters used in chemical analysis are not adequate to the purpose for which they are employed. This is especially true in microanalysis where great care must be taken not to contaminate the filtrate or to lose any of it. In the past, the conventional filter for such use was a porous ceramic plate supported in a funnel made from glass. While these filters were adequate in terms of their ability to filter, they suffered from the fact that the pores of the filter readily became clogged with debris from the filtrate. This clogging not only decreased the rate of filtration, but also introduced contaminants into the filter and trapped part of the filtrate in the clogged passages. Repeated use of such filters was impossible without extensive cleaning.

The use of paper filters helps to reduce the effect of contamination since these filters can be discarded after each use. Paper filters, however, are generally inconvenient to use and require extensive handling which in itself introduces contamination. Also, paper filters are generally used in conjunction with an external support, without which they could not support the weight of the filtrate. The use of such supports reintroduces the problem of contaminating the filtrate with debris trapped in the pores of the support. With the advent of paper filters, reinforced with woven scrims, the problem of contaminated supports is lessened, since a minimal support is required. However, other problems arise unless the filter is properly designed. Usually the filter cloth is supported within a glass or stainless steel filter tube by clamping the filter cloth between two portions of the tube itself. This procedure has several disadvantages. First, there is a high probability that the filter will be damaged if care is not taken in positioning the filter and in tightening the clamp. Second, the clamping procedure leaves crevices between the portions of the tube and within the clamp itself. These crevices serve to hold the filtrate, and result in contamination and loss of the filtrate. Even if these problems could be solved, to avoid contamination in precise measurements, the filter tubes themselves would have to be cleaned between each insertion of a new filter cloth, or discarded. Since the systems are too expensive to be discarded, the cleaning step is necessary. This is an expensive and time consuming procedure.

SUMMARY OF THE INVENTION

The present invention is a novel way to surmount the problems inherent in the above filters by constructing the filter unit from a woven filter cloth bonded to a support in a manner such that few crevices are formed to cause filtrate loss. The materials and designs involved are simple and inexpensive so that the problem of contamination can be overcome by simply disposing of the whole unit.

The advantages of the apparatus can best be illustrated with reference to the figures wherein.

DESCRIPTION OF DIAGRAMS

Figure 1:
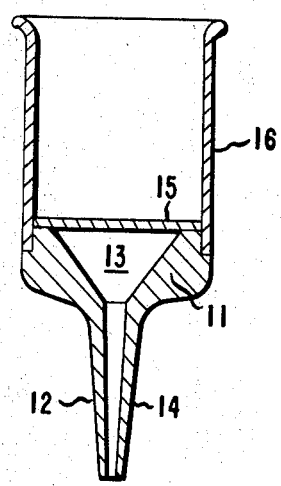
FIG. 1 is an illustration of one possible embodiment of this invention.

FIG. 1 is a cutaway, side view, of one possible embodiment of the present invention. In this embodiment the support means 11 is in the form of a conventional funnel. It has a stem 12 and a conical-shaped opening 13 which tapers into a cylindrical passage 14 through the stem. The filter cloth 15 is supported at its edges on the support means but, in the center, it supports its own weight and the pressure of any filtrate placed in the filter unit. One suitable way to make such a filter cloth is to coat a woven cloth with a suitable filter medium, such as microporous cellulose acetate. Presently available filter cloths use nylon as the scrim, but any suitable fibrous material would suffice. The important step in the construction of the filter is not in the construction of the filter cloth, but in the selection of the proper filter cloth, and in the installation of this filter cloth into a filter unit by bonding the filter cloth to the support.

One way in which this bonding can take place is to make the support means 11 from some suitable thermoplastic, e.g. cellulose acetate butyrate, and to bond the filter cloth 15 to the support by a heat seal. Heat sealing is a well-known technique which will not be described here other than to say that an iron of the proper shape applied to the top of the filter cloth in those regions where it touches the support would be a suitable way of making the seal. The temperature of the iron would have to be such that it will melt the thermoplastic without damaging the filter. If the support is made from cellulose acetate butyrate and the filter cloth is made from cellulose acetate supported by a nylon scrim, then a temperature must be chosen which is sufficient to melt the support and the cellulose acetate of the filter in the region of contact with the iron, so that a bond is formed between them, without damaging the central portion of the filter.

Another way in which the bond can be made is to adhere the filter cloth to the support with an adhesive. This would require great care to insure that the adhesive is confined to the region where the filter mates with the support; otherwise, the filter would be partially clogged or dissolved by the adhesive. In this case the support means can be made from any nondeformable material which will take the particular adhesive used. The adhesive would have to be of a variety that would not be dissolved by solvents likely to be employed in the course of using the filter. Conventional epoxy cements would be suitable for this purpose.

Another way in which the bond can be made is to soften the material from which the support is made with a suitable solvent for that material and to press the filter cloth into place. If the support is made from cellulose acetate butyrate, acetone or methyl ethyl ketone would be a suitable solvent.

Another way in which the bond can be made is to press the filter cloth onto the support means with some die, vibrating at ultrasonic frequencies.

Regardless of how the bond is made, it is important that the area of the support in contact with the filter cloth is kept to a minimum, so that more of the unbonded filter cloth will be exposed to the filtrate and less filtrate will be trapped by the support.

To funnel filtrate through the filter, a supply tube 16 is needed. This supply tube can be made of any suitable material, and can actually be an integral part of support means 11. In this embodiment, the supply tube is a thin walled cylinder of some thermoplastic, such as cellulose acetate butyrate, which is press fit onto support means 11. Optionally, the supply tube can be bonded to the support after it has been press fit into place. It is important that the fit between the supply tube 16 and the support means 11 is tight, and that the filter cloth 15 extends to the point where the support means and the supply tube meet. If this is not true, there are excessive regions of the filter where filtrate can be trapped.

Figure 2:
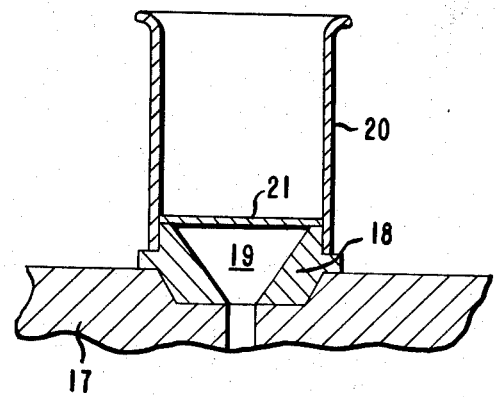
FIG. 2 is an illustration of another possible embodiment of this invention.

FIG. 2 is a diagram of another possible embodiment of this invention. This embodiment is meant to be used in conjunction with a special filter holder 17 which is part of some apparatus, not shown. In this embodiment the support means 18 is a disc with a funnel-shaped opening 19 through it, concentric with the axis of the disc. The bottom of the disc is tapered so that the disc will fit into the filter holder, as shown. The top of the disc may also be tapered to receive the supply tube 20, however, it has been found that tapering in this region tends to increase the amount of fluid trapped between the support and the supply tube, so in this respect such tapering is undesirable. The filter cloth 21 is bonded to the support 18 in any of the ways mentioned above, and the support is made from any material suitable for the bonding technique chosen. The supply tube 20 is again either press fit onto the support or an integral part of the support.

Figure 3:
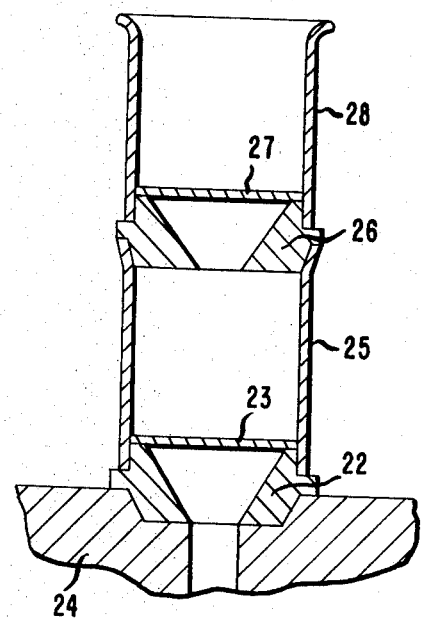
FIG. 3 is an illustration of how two possible embodiments of this invention, such as that shown in FIG. 2, can be nested together.

FIG. 3 is a diagram of how two filter units of the type shown in FIG. 2 can be nested together. Such a configuration would be useful when several filtration steps are required to obtain the desired purity. In this configuration the support 22 for the first filter cloth 23 is contained in a special filter holder 24 which is part of some apparatus, not shown. The supply tube 25 for the first filter unit also serves as a support for the second filter unit. The support 26 for the second filter cloth 27 is press fit into the supply tube 25, so that it is advantageous for the bottoms of both disc-shaped supports of FIG. 3 to be tapered.

Figure 4:
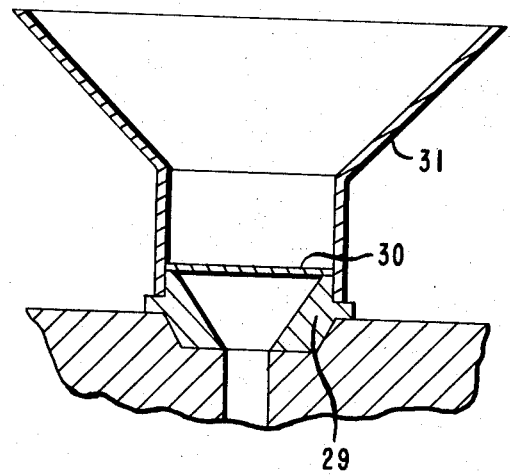
FIG. 4 is an illustration of another possible embodiment of the invention.

FIG. 4 is a diagram of another possible embodiment of the present invention. In this figure the support 29 and the filter cloth 30 are the same as that shown in FIG. 2. The supply tube 31, however, is no longer a tube, but takes the form of a funnel. This figure is meant to illustrate that not only can the support means 29 be adapted to fit the requirements of a specific design, but so can the supply tube.

The versatility of the invention can be illustrated by reference to one possible use for such a filter. Recently, an instrument (the DuPont Luminescence Biometer) has been developed to measure bioluminescent and chemiluminescent reactions. The operation of this instrument depends upon the extraction of adenosine triphosphate (ATP) from bacterial cells. For the purposes of this discussion, the extraction procedure begins with the separation of bacteria from the fluid in which they were suspended, by using a filter unit such as that shown in FIG. 2. As the filtrate passes through the filter cloth, the bacteria are deposited on the filter cloth. The problem is how to extract the ATP from the bacteria. It has been found that the addition of various organic solvents will extract ATP from various types of bacteria, so the simplest way to handle the bacteria on the filter cloth is to leave it there, and to wash them with a suitable amount of the proper organic solvent. Upon passing through the filter cloth, the solvent will extract ATP from the bacteria and carry it through the filter, leaving bacterial debris behind on the filter cloth to be discarded when the filter unit is discarded. If the instrument is to be used continuously, a great many such extractions must be made. If the filter unit has to be cleaned after each extraction; extraction would be a burdensome job. By using a filter unit, such as that described above, which is inexpensive enough to be discarded and yet designed so that the majority of the material deposited on the filter cloth is accessible to the extraction process, the extraction becomes a reasonable procedure.

If such a procedure were to be utilized, the value of having the supply tube separate from the support becomes evident. The support and the attached filter could be identical no matter what volume of sample might be used. But the volume of the supply tube would be dependent on the volume of sample involved. For simplicity a set of interchangeable supply tubes, of various volume, could be provided; each capable of being fitted onto the same support, and each marked to show what amount of solvent should be added.

We claim:

1. A disposable, substantially crevice-free microbiological filter unit comprising:
    an outlet means with a single opening disposed therethrough, one end of said outlet means being in the form of a narrow ridge surrounding the opening;
    a microporous nonself-supporting filter cloth comprising a fibrous scrim supported by and extending to the outer periphery of the narrow ridge surrounding the opening in said outlet means, said filter cloth being bonded to, supported solely by, and in contact with said outlet means solely at the periphery of said filter cloth; and
    a cylindrical supply means having a portion with an internal diameter less than the diameter of the outer periphery of the narrow ridge on said outlet means, said supply means being press fit around the outer periphery of the narrow ridge surrounding the opening in said outlet means and the edge of said flexible filter cloth extending thereto in a manner such as to form a leaktight, crevice-free union between said supply means and said filter cloth.

2. The filter unit of claim 1 wherein said outlet means is made from a thermoplastic material, and the bond between the ridge of said outlet means and said filter cloth is a heat seal.

3. The filter unit of claim 2 wherein said heat seal is an ultrasonic seal.

4. The filter unit of claim 1 wherein said outlet means is made from a material soluble in a solvent and the bond between the ridge of said outlet means and said filter cloth is a press seal formed by softening said ridge of said outlet means with said solvent and pressing said filter cloth into said softened ridge of said outlet means.

5. The filter unit of claim 1 wherein the bond between said outlet means and said filter cloth is an adhesive bond.

6. The filter unit of claim 1 wherein said supply means is a removable supply means made from a thermoplastic.

7. The filter unit of claim 1 wherein said outlet means is a disc-shaped outlet means with a funnel shaped opening through said disc concentric with the axis of said disc, and wherein said disc-shaped outlet means is tapered around the bottom edge whereby stacking with other filters of similar design is facilitated.